Patented Jan. 25, 1938

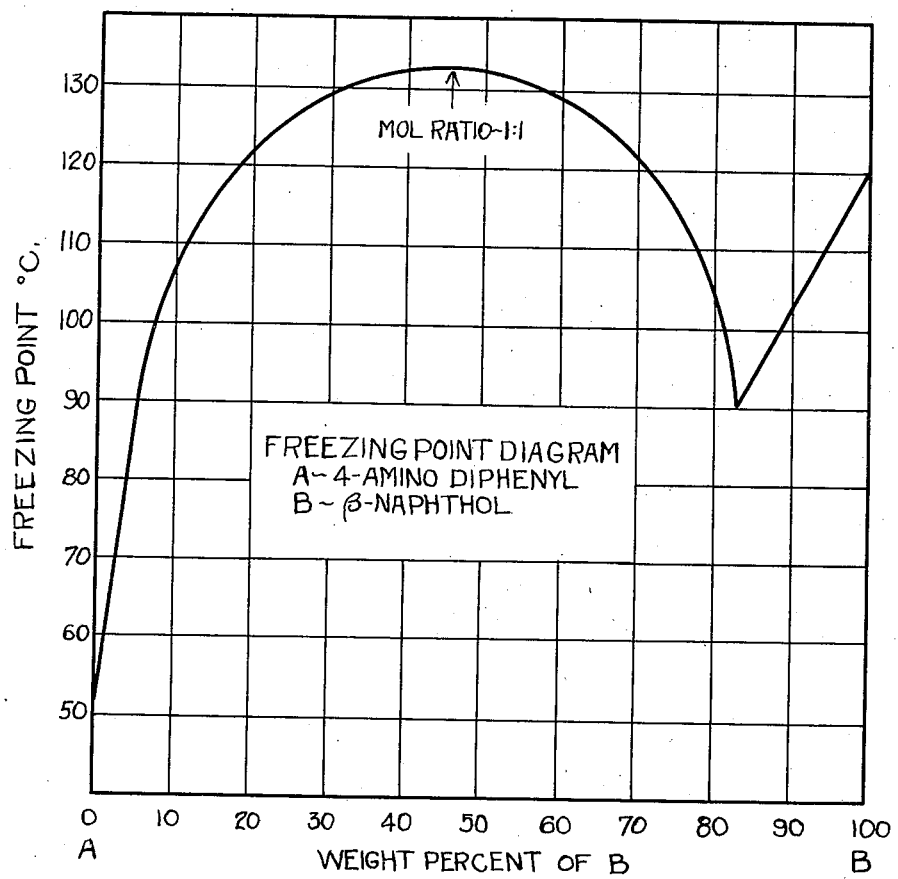

2,106,551

UNITED STATES PATENT OFFICE 2,106,551

4-AMINODIPHENYL COMPOUNDS

Russell L. Jenkins, Anniston, Ala., assignor, by mesne assignments, to Monsanto Chemical Company, a corporation of Delaware Application January 24, 1935, Serial No. 3,265

2 Claims. (Cl. 260—130.5)

This invention comprises a molecular compound of 4-aminodiphenyl and beta-naphthol.

One object of this invention is to provide a new compound of 4-aminodiphenyl and beta-naphthol which is useful as an antioxidant or a constituent thereof, or which may be used for disinfecting or preservative purposes and for other general chemical purposes where the amino and phenolic grouping in complex form is desired.

Reference is made to the accompanying drawing, the single figure of which illustrates the freezing point of my new compound and also the initial freezing point (or hold point) of compositions containing varying proportions of the complexes.

In the drawing:

Figure 1 shows the melting point range for the system: 4-aminodiphenyl, beta-naphthol, and indicates a molecular compound of the type $NH_2$ (para) $C_{12}H_9 \cdot C_{10}H_7OH$, having a melting point of approximately 132° C. This compound is a crystalline body. This figure also illustrates the freezing points (or hold points) of compositions containing varying proportions of the compound together with one or the other of its constituent substances. The presence of a eutectic is indicated at one end of the curve.

The compound herein disclosed may be prepared by mixing together the constituent substances in the proportion indicated and melting and then cooling the mixture. An alternative method is to effect the combination by mixing together solutions containing the constituent compounds and thereby causing the compound to precipitate from solution.

I have observed that the compounds described are less soluble in most solvents than the constituent compounds thereof. This fact affords a ready means for removing from solution either one of the constituent compounds by the addition of a solution containing the requisite quantity of the other compound.

The molecular compound may be broken up by forming a salt of one of the constituents by the addition of either an alkali or an acid to the complex. Accordingly, I may add an acid to the complex and thereby form the acid salt of the amine. If the acid so chosen forms an insoluble salt, I leach the acidified mixture with an appropriate solvent to remove the other constituent. In the same manner I may add an alkaline solution to the complex, form the naphtholate, and then dissolve the naphtholate from the mixture.

Having now particularly described my invention and the manner of compounding the same, it will be apparent that it is susceptible to various changes and modifications without departing from the spirit thereof, and I desire, therefore, that it be not limited except as indicated by the prior art or as set out in the appended claims.

What I claim is:

1. As a chemical compound the addition product of 4-aminodiphenyl and beta naphthol, said addition product being characterized by the fact that upon the addition of acid thereto 4-aminodiphenyl acid addition salt and beta naphthol are liberated.

2. A method of preparing the addition product of 4-aminodiphenyl and beta naphthol which comprises heating a mixture of said materials in the absence of solvents to melting temperature.

RUSSELL L. JENKINS.